March 7, 1967   C. LUDWIG   3,307,717
BUCKET WHEEL BULK MATERIAL HANDLING APPARATUS
Original Filed April 13, 1964   7 Sheets-Sheet 1

INVENTOR.
Carl Ludwig
BY
Schramm, Kramer & Stenger
attorneys

March 7, 1967 C. LUDWIG 3,307,717
BUCKET WHEEL BULK MATERIAL HANDLING APPARATUS
Original Filed April 13, 1964 7 Sheets-Sheet 5

INVENTOR.
Carl Ludwig
BY
Schramm, Kramer & Stenger
attorneys 3,307,717
BUCKET WHEEL BULK MATERIAL HANDLING
APPARATUS
Carl Ludwig, Cleveland, Ohio, assignor to McDowell-Wellman Engineering Company, a corporation of Ohio
Continuation of application Ser. No. 359,340, Apr. 13, 1964. This application Mar. 28, 1966, Ser. No. 538,102
12 Claims. (Cl. 214—14)

This application is a continuation of application Serial No. 359,340, filed April 13, 1964, now abandoned.

This invention relates to a rotary bucket wheel device for handling bulk material, and more particularly to an improved rotary bucket wheel unloader used in a barge unloading system.

A barge unloading station comprises inshore and offshore towers which are cross connected into a common framework. This framework provides support and guidance for an elevating, counterbalanced, bridge spanning the barge berth between the towers.

The movable bridge supports a bucket wheel reclaiming unit and a gathering conveyor that discharges on to a conveying system for storage, or discharge into overland transporting vehicles or trains.

The barge, to be unloaded, is brought under the bridge between the towers and tied into a haulage system, which brings the barge into unloading position. The counterbalanced bridge structure is then lowered until the bucket wheel touches the bulk material to be unloaded. The bucket wheel operates longitudinally from end-to-end or transversely across the barge, side-to-side or a combination of these motions unloading the bulk material. The material is scooped up by the rotating buckets and dropped onto the gathering conveyor, which discharges onto the elevating conveyor connected to the landward conveying system.

The present unloaders have their bucket wheels concentric with the movable supporting bridge. Their conveyors are also supported within this bridge. To support these loads the bridge must be heavily constructed. To be concentric with such heavy framework necessitates the use of an enormous bucket wheel. By suspending the bucket wheel beneath the supporting bridge a much smaller wheel may be used. This wheel is more maneuverable and rotates faster, thus speeding up the unloading operation. A compound wheel comprising a plurality of these smaller wheels, and having its transverse section equal to that of a conventionally designed barge may also be suspended from the bridge. The transverse or side-to-side motion of a single wheel is eliminated, and only a sweeping unloading pass or passes from end-to-end of the barge are necessary to unload the material. These smaller wheels weigh less, and consequently a smaller supporting bridge may be used. Weight is a very important factor in design; therefore, the use of smaller components is extremely important. Furthermore, by using smaller bucket wheels there is more room below the supporting bridge, and an operator's station may be suspended along with the wheels, giving the operator greater control over the unloading operation.

Briefly stated this invention is a barge unloading system for unloading bulk material from a barge. This system has a plurality of towers offshore and inshore, which define an unloading station. These towers are cross connected into a common framework to form a gantry type structure. This structure provides support and guidance for an elevating, counterbalanced supporting bridge that spans the barge berths between the towers. A bucket wheel reclaiming unit is suspended below the bridge from a trolley assembly which is movable along the bridge. A compound bucket wheel reclaiming unit comprising a plurality of bucket wheels having their buckets overlapping, and having its transverse section equal to the transverse section of the barge may also be suspended from the bridge. Using the latter method speeds up the unloading operation and does not necessitate any transverse movement of the bucket wheel reclaiming unit along the bridge. The bridge also supports a gathering conveyor that runs through the wheel and discharges onto an elevating conveyor connected to a landward conveyor system. This station also has a haulage system to which the barges are tied. This system permits the barges to be held in an unloading position within the gantry type structure. This system also permits the barge to be pulled through the station as it is being unloaded.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Figure 1:
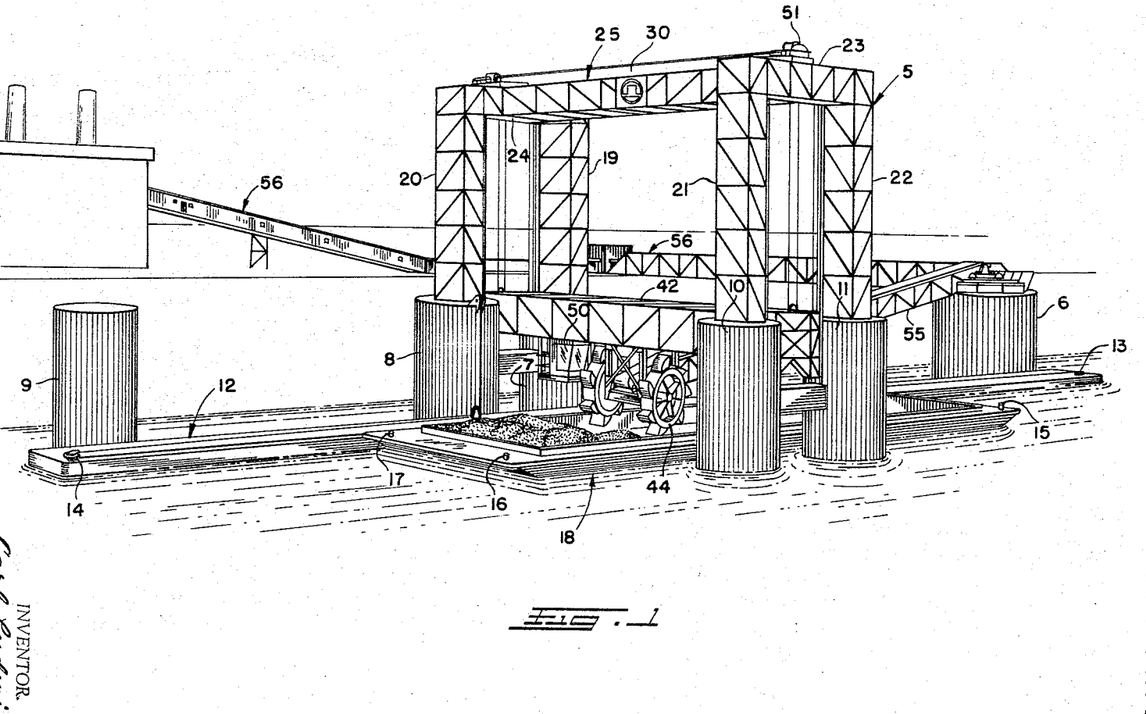
FIG. 1 is a perspective view of a barge unloading station showing a barge docked at pier and spanned by bridgework mounted on supports for supporting a rotary bucket wheel unloader suspended therefrom, elevator cables, and a conveyor system for transferring bulk material to land based storage or transporting means.
Figure 3:
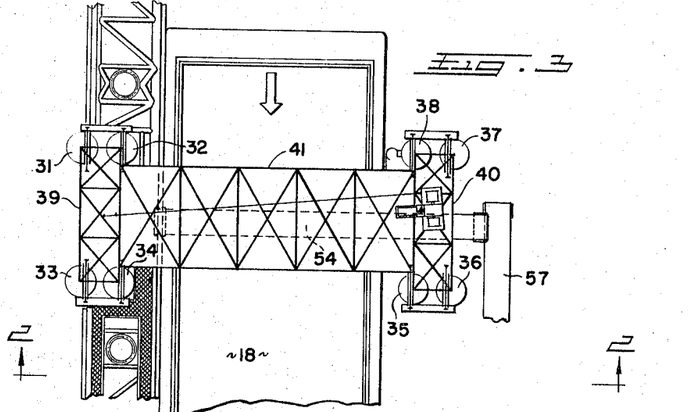
FIG. 3 is a top view of the barge unloading station as it appears in the plane indicated by the line 3—3 in FIG. 2.

Referring more particularly to FIG. 1 of the annexed drawings, there is shown a barge unloading station generally indicated at 5, formed by a plurality of inshore and offshore caissons, for example, the caissons 6, 7, 8, 9, 10 and 11. Secured to a plurality of these caissons, for example, caissons 6, 7, 8 and 9, is a pier generally indicated at 12. Secured to the pier 12 are a plurality of sheaves for example, sheaves 13 and 14 to which guide wires are attached from similar sheaves on a barge for example, the sheaves 15, 16 and 17 on the barge generally indicated at 18. These sheaves and wires comprise a haulage system used to bring the barge into unloading position within the unloading station. Extending from the caissons 7, 8, 10 and 11 are conveniently trussed towers 19, 20, 21 and 22, respectively. The towers are cross connected by rigid frames, for example, the tower 19 is cross connected to adjacent tower 20, and tower 21 is cross connected to adjacent tower 22 by similar frames 24 and 23, respectively, to form rigid frames or bents. These two bents or frames are then cross connected by a larger but similarly trussed frame 30 to form a gantry type frame structure generally indicated at 25. This gantry type structure 25 may also be composed of a plurality of caisson type towers, for example, the caisson towers 31, 32, 33, 34, 35, 36, 37 and 38 as seen in FIG. 3. These caisson type towers are similarly cross connected by trussed frames 39, 40 and 41 to form a gantry type structure.

Figure 2:
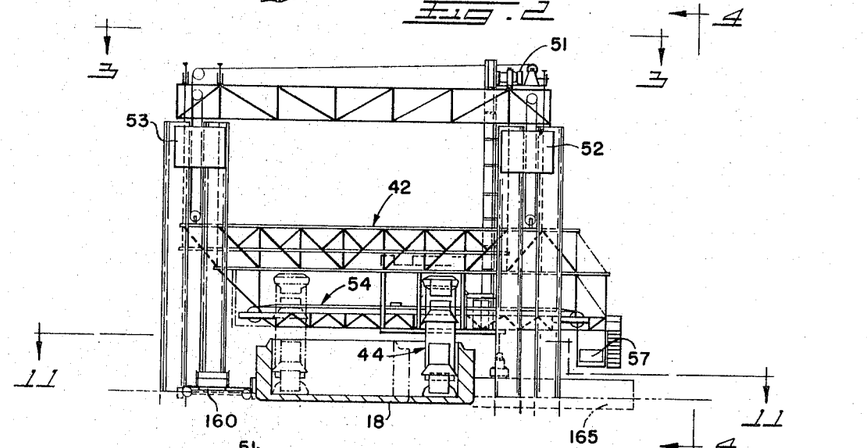
FIG. 2 is an elevation of the barge unloading station as it appears in the plane indicated by the line 2—2 in FIG. 3.
Figure 4:
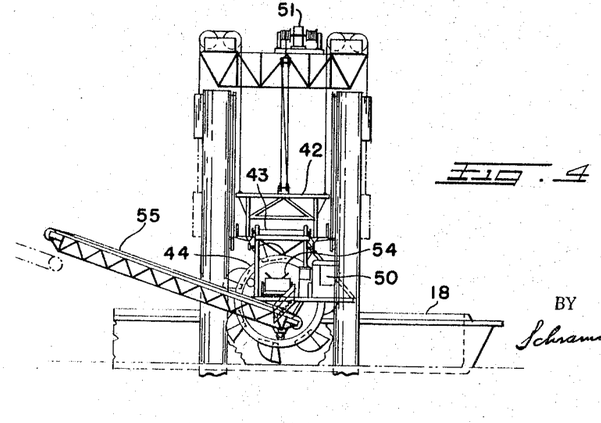
FIG. 4 is an end view of the barge unloading station as it appears in the plane indicated by the line 4—4 in FIG. 2.

The gantry 25 supports and guides an elevating, counterbalanced bridge generally indicated at 42, which spans the barge berth between the tower caissons 7, 8, 10 and 11. Bridge 42 may extend in cantilevered manner beyond towers 7, 8, 10 and 11. Supported on a trackway within the bridge 42 is a trolley assembly generally indicated at 43 as best seen in FIG. 4. Affixed to the trolley assembly 43, suspended below the bridge 42, is a bucket wheel reclaiming unit generally indicated at 44, FIG. 1. An operator's station generally indicated at 50 is also supported by the bridge 42. The operator's station may be affixed to the bucket wheel reclaiming unit 44 as in this embodiment of the invention, or separately suspended from a separate trolley assembly within the bridge 42. The operator's station 50 is suspended below the bridge to give the operator better visibility and hence better control over the unloading operation. The supporting bridge 42 is raised or lowered by conventionally designed cable, drum and motor means, for example, the motor means 51 affixed atop the gantry 25. All moving apparatus is automatically controlled from the operator's station 50. The bridge 42 is counterbalanced by weights attached to the bridge, and hung from the towers through a series of pulleys, for example, the weights 52 and 53 as seen in FIGS. 2 and 4. These counterweights facilitate the raising and lowering of the bridge 42. Located within the suspended bucket wheel unit 44 is a gathering conveyor generally indicated at 54, as seen in FIGS. 2 and 4. This conveyor 54 may be relatively short, as seen in FIGS. 1 and 4, carrying bulk material received from the bucket wheel to an elevating conveyor 55 affixed to the bucket wheel unit 44 as seen in FIG. 1. The bulk material is then carried by the elevating conveyor 55 to a landward conveying system generally indicated at 56, as best seen in FIG. 1, or the gathering conveyor 54 may be relatively long extending beyond the transverse span of the barge berth between the caissons as seen in FIG. 2. The bucket wheel unit 44, as it moves transversely along the bridge 42 unloading the barge spills bulk material onto the gathering conveyor 54, which carries the material to the side and dumps it on a similar elevating conveyor 57 not affixed to the bucket wheel as seen in FIGS. 2 and 3. The gathering conveyor 54 when used in this manner is supported at its extremities by the bridge 42, and intermediately supported within the bucket wheel unit 44. Whichever conveyor method is more suitable to the unloading operation may be employed.

Figure 5:
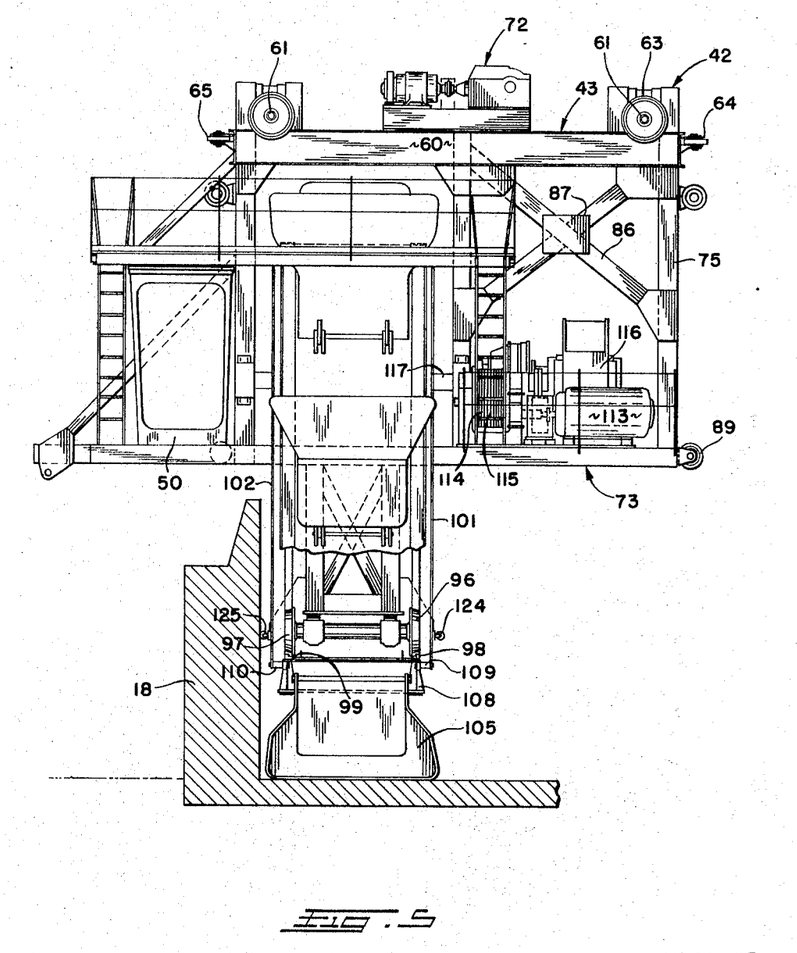
FIG. 5 is an enlarged fragmentary view of a bucket wheel as it appears in the plane indicated by the line 5—5 in FIG. 6.
Figure 6:
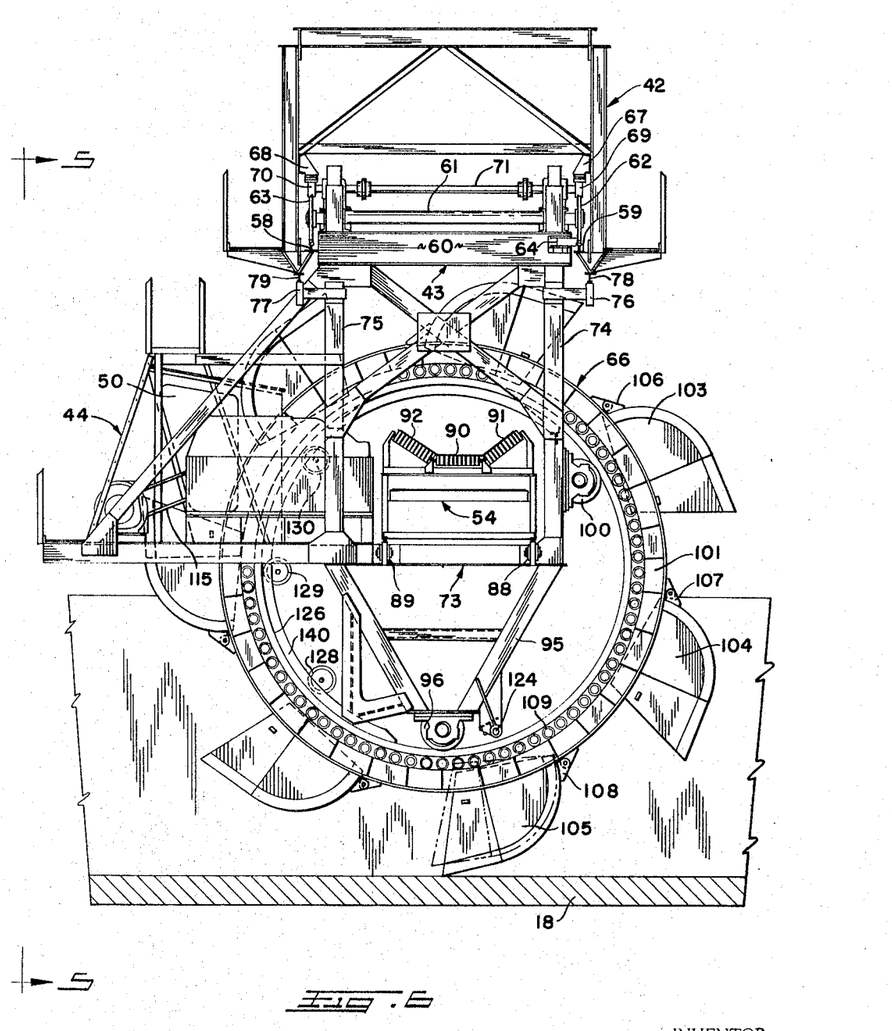
FIG. 6 is an enlarged fragmentary side view of the bucket wheel unloader of FIG. 5.

Referring to FIGS. 5 and 6, the bridge 42 supports a longitudinally coextending trolley supporting trackway, including the rails 58 and 59 secured to each side of the bridge 42. Transversely moving along the bridge 42, on this trackway is the trolley assembly 43. The trolley assembly 43 includes a platform or frame, generally indicated at 60, composed of conventionally trussed members. A pair of axles such as axle 61 are rotatably affixed to the frame 60 adjacent its front and back extremities, each axle having at its extremities trolley wheels to ride on the rails of said trackway, for example trolley wheels 62 and 63 on axle 61 ride on rails 59 and 58, respectively. At each of said extremities of the trolley frame 60, adjacent the rail 59 is a thrust roller, for example thrust rollers 64 and 65, which lie in a horizontal plane and are adapted to rotatably and compressively engage the side of the adjacent rail 59. The lateral force or thrust caused by the rotating bucket wheel, generally indicated at 66, has a tendency to derail the trolley assembly 43 from the supporting trackway. Thrust wheels 64 and 65 transmit any horizontal thrust force to the rail 59 affixed to the bridge 43, where such thrust force is absorbed. Secured at either side of and coextensive with the bridge 42, in parallel spaced relation to the trolley supporting trackway but oppositely disposed are the longitudinal upper drive rails 67 and 68, forming a drive wheel trackway, which is adapted to coact with a plurality of drive wheels mounted on the trolley assembly 43, for example, the drive wheels 69 and 70 on shaft 71 which is rotatably secured atop the trolley assembly 43. A drive wheel coacts with each of said trolley wheels of the trolley assembly 43, and the fixed drive rails of the drive wheel trackway. The drive wheels drive the trolley assembly 43 along the bridge 42. The drive wheels are rotated by a conventionally geared motor driven means indicated at 72. The motor 72 is affixed atop the trolley frame 60 of the trolley assembly 43. The bucket wheel 66 is rotatably mounted on and within a bucket wheel supporting frame or carriage, generally indicated at 73, which is suspended below the bridge 42. The carriage 73 includes a plurality of vertically trussed supporting members, for example, members 74 and 75 which are affixed to the trolley assembly 43. Secured to said supporting members adjacent the lower extremity of the bridge 42 are a plurality of guide wheels, for example, the guide wheels 76 and 77, which are mounted on the vertical members 74 and 75, respectively. These guide wheels lie in a vertical plane and are adapted to coact with a guide trackway having its rails parallel but oppositely disposed to the rails of the supporting trackway. The rails of said guide trackway are secured to the lower extremity or marginal edges of the bridge 42, for example, the guide wheels 76 and 77 are adapted to coact with the guide rails 78 and 79 respectively of the guide trackway which is affixed to the lower extremity of the bridge 42. The guide wheels 76 and 77 attached to the bucket wheel frame 73, coact with the oppositely disposed trolley wheels 62 and 63 of the trolley assembly 43, to hold the trolley assembly 43 securely within the bridge 42 as the bucket wheel rotates.

As was previously stated the bucket wheel supporting frame or carriage 73 is suspended from the trolley assembly 43 by a plurality of vertical members. These members are braced by angularly trussed members, for example, members 86 and 87. Rotatably secured to the bucket wheel supporting frame 73 are a plurality of conveyor support wheels, for example, the support wheels 88 and 89 on which a gathering conveyor generally indicated at 54 is slidably supported. The gathering conveyor 54 is located within the bucket wheel 66 and is adapted to receive the unloaded material spilling from the bucket wheel 66, and to convey it to other conveying means. The gathering conveyor 54 may be made of standard conveyor parts, and has a sloped side wall configuration which is best suited for this gathering operation. As seen in FIG. 6 the gathering conveyor 54 comprises a horizontal conveyor section 90 having upwardly and outwardly extending conveyor sections 91 and 92. The sloped sections 91 and 92 keep the material within the conveyor. In this embodiment of the invention the operator's station 50 is also affixed to the bucket wheel supporting frame 73. The bucket wheel 66 is rotatably secured and concentric with the bucket wheel supporting frame assembly 73. Extending below and integral with the bucket wheel supporting frame assembly 73 is an inverted A-frame assembly 95. Rotatably affixed to the distal extremity of this A-frame 95 is a pair of idler wheels 96 and 97. These idler wheels 96 and 97 are adapted to coact with the guide rails 98 and 99, respectively, which are affixed to the inner periphery of the bucket wheel 66. A plurality of pairs of similar idler wheels, for example, the idler wheels indicated at 100 are similarly adapted to coact with the guide rails. The idler wheels are rotatably secured to the bucket wheel support frame or carriage 73 in such circumferential spaced relation as to keep the bucket wheel 66 rotating about a predetermined center.

Figure 7:
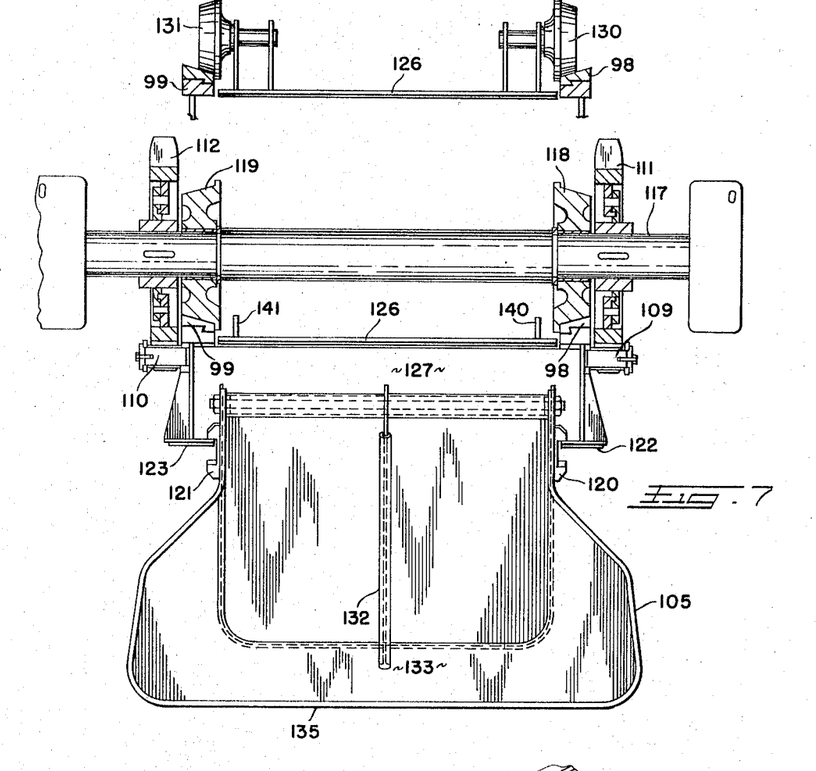
FIG. 7 is an enlarged fragmentary sectional view of the bucket showing the means to rotate said bucket, the idler guide wheels, and the mold board.

The bucket wheel 66 is formed by a pair of annular rings or rims 101 and 102 in fixed parallel spaced relationship. A plurality of buckets, for example the buckets 103, 104 and 105 are pivotally secured to brackets on the outer periphery of the annular rims 101 and 102, for example, the buckets 103, 104 and 105 are pivotally secured to the brackets 106, 107 and 108. Located on the outer surface of the rims 101 and 102 are a plurality of outstanding circumferentially spaced drive pins, for example drive pins 109 and 110 as best seen in FIGS. 6 and 7. These drive pins are adapted to coact with standard motor driven gears, for example, the drive gears 111 and 112 coact with the drive pins 109 and 110, respectively, to rotate the bucket wheel 66. A motor 113 of conventionally designed parts affixed to the bucket wheel supporting frame 73 rotates a pulley 114 containing a plurality of belts 115 which drive a drive pulley secured to the shaft of a reducer 116. The reducer 116, either my hydraulic or mechanical means, reduces the number of rotations required to a drive shaft 117 to which the drive gears 111 and 112 are secured or keyed. It should be noted that in this embodiment of the invention a pair of idler wheels 118 and 119 similar to the idler wheels 96 and 100 are keyed to the drive shaft 117 adjacent the drive gears 111 and 112 as best seen in FIG. 7.

Figure 8:
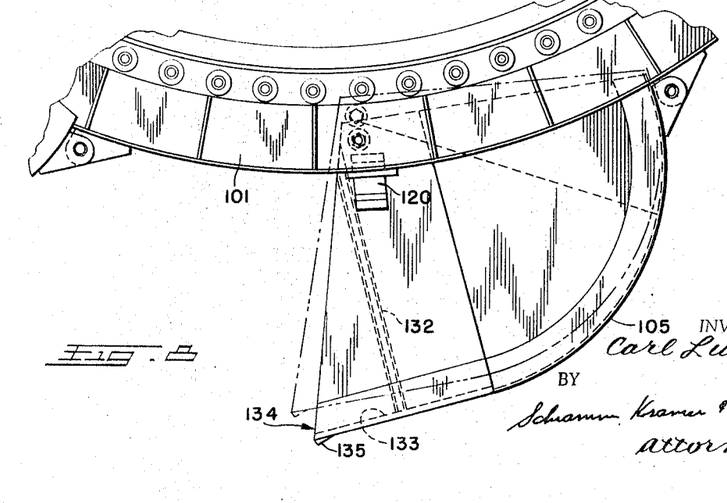
FIG. 8 is an enlarged fragmentary side view of the bucket of FIG. 7.

As previously indicated the buckets are pivotally secured to the bucket wheel 66; however, this pivotal movement is restricted by a pair of U-shaped guide brackets 120 and 121 which are affixed to the sides of each bucket, and are adapted to coact with extending peripheral edges 122 and 123 of each of the rims 101 and 102, respectively. This pivotal movement provides better scraping action of each individual bucket against the bottom surface of a barge. It also provides for vertical movement of each bucket in case bumps or obstructions on the bottom surface of said barge are encountered. Also provided in each bucket to eliminate stoppage of the rotary wheel caused by obstructions such as overlapping barge plates, is a bulbed scooping edge adapted to override such obstacles; for example, the bulbed scooping edge 135 of bucket 105 as seen in FIGS. 7 and 8. Further, the bridge 42 is so counterbalanced as to absorb vertical surges of the rotating wheel occasioned when obstacles are encountered. Secured at either side of the A-frame assembly 95 of the bucket wheel supporting frame adjacent the idler wheels 96 and 97 and protruding beyond the rims 101 and 102 are a pair of limit switches 124 and 125, respectively. These switches coact with the sides of a barge to limit the transverse motion of the bucket wheel 66. In this way the bucket wheel 66 is kept from contacting and possibly damaging the sides of the barge.

An annular ring or mold board 126 disposed between the annular rims 101 and 102, is affixed to the bucket wheel frame 73. The mold board 126 coacts with the back scrape plate of each bucket, for example, scrape plate 127 of bucket 105 as seen in FIG. 7 coacts with the mold board 126 as the material is lifted and spilled onto the gathering conveyor 54. An example of this mold board is best seen in the dotted drawing of FIG. 9. The mold board 126 coacts with similar scrape plates of each individual bucket from a point adjacent the lowest inner circumferential surface of said bucket wheel or from the first point of bucket scooping action to a point adjacent the gathering conveyor 54, or to the first point of bucket spilling action. The bulk material to be unloaded is held within each bucket as it is being rotated to the spilling point by the scrape plate coacting with the mold board. The material is held against the mold board until it spills onto the gathering conveyor 54. In the embodiment of the invention shown in FIGS. 6 and 7, a plurality of pairs of mold board idler wheels, for example, pairs of idler wheels indicated at 128, 129 and 130 (FIG. 6) are rotatably secured to and circumferentially spaced along the curved mold board 126. These mold board idler wheels coact with the guide rails affixed to the rims 101 and 102; for example, in FIG. 7 the idler wheels 130 and 131 coact with the guide rails 98 and 99. Any lateral swaying movement of the bucket as it rotates will be compensated for by similar lateral swaying movement of the mold board 126 produced by the coaction of the rails 98 and 99 with the mold board idler wheels. The mold board is reinforced by outstanding rib sections 140 and 141. In the embodiment of the bucket wheel in FIGS. 7 and 8, a spring 132, secured at its extremities to the inner bucket scooping surface 133 and the bucket wheel 66 is used to keep the bucket in a fully extended position, for example, the bucket 105 in the position indicated at 134 as seen in FIG. 8.

Figure 9:
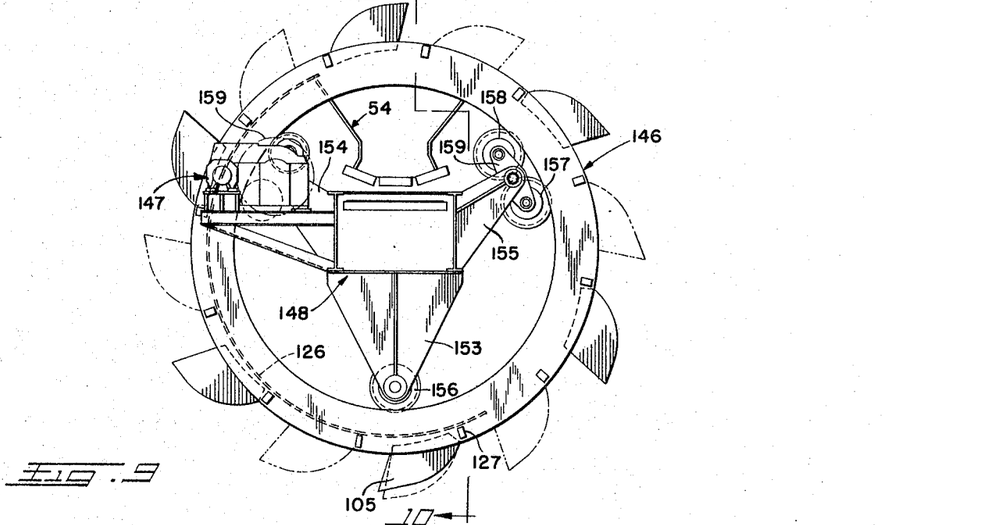
FIG. 9 is an enlarged fragmentary side view of a compound bucket wheel.
Figure 10:
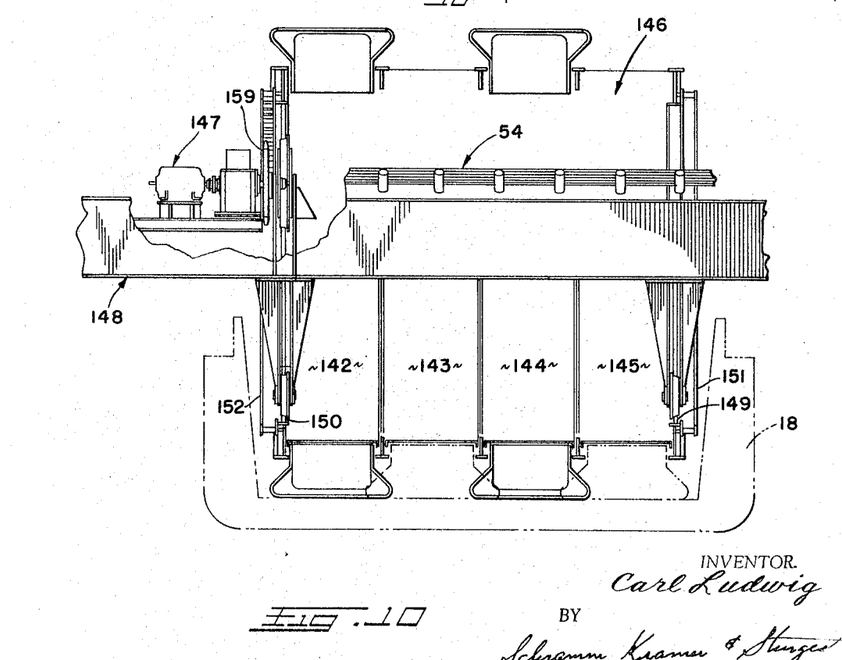
FIG. 10 is a fragmentary sectional view of the compound bucket wheel as it appears in the plane indicated by the line 10—10 in FIG. 9.

The embodiment of the bucket wheel shown in FIGS. 9 and 10 is a compound bucket wheel composed of a plurality of individual bucket wheels similar to the bucket wheel 66, for example, bucket wheels 142, 143, 144 and 145. This compound bucket wheel has an axial dimension slightly smaller than the width of the hold of a conventionally designed barge 18. The buckets as seen in the dotted portion of FIG. 10 overlap in width to produce a clean unloading action. In the particular embodiment of the invention the gathering conveyor 54 is suspended within the bucket wheel 146. This conveyor can be fixed within the compound bucket wheel member 146 since traversing the cross section of the barge 18 is not necessary as in the case of using a single bucket wheel. The motor driven means generally indicated at 147, and used to rotate the compound bucket wheel 146 is similar to the motor driven means used to rotate the bucket wheel 66 is seen in FIG. 5. The motor driven rotating means 147 is located adjacent the compound bucket wheel 146 and is affixed to the bucket wheel frame assembly generally indicated at 148. It should be understood that a pair of similar synchronized rotating means could be affixed adjacent each side of the compound bucket wheel 146.

A plurality of spaced idler wheels affixed to the supporting frame assembly 148 are adapted to keep the compound bucket wheel 146 rotating about a fixed axis. These idler wheels are adapted to rotate on the guide rails 149 and 150 which are affixed to the inner periphery of the bucket wheels outer annular rims 151 and 152, respectively. In the embodiment of the invention shown in FIG. 9 the bucket wheel frame 148 has at each of its extremities outstanding frame portions, for example, frame portions 153, 154 and 155, each of said frame portions having idler wheels rotatably secured at their distal extremities to coact with the guide rails on the inner periphery of the annular rims 151 and 152. The lowest extending frame portion 153 has a single idler wheel 156 rotatably secured at its distal extremity. The remaining oppositely disposed and outwardly extending frames 154 and 155 each have pairs of idler wheels rotatably and pivotally secured at their distal extremities, for example, the idler wheels 157 and 158 are rotatably secured between the extremities of a pair of similar link arms 159 which are pivotally secured at the distal extremity of the frame 155 intermediate the link arm extremities. A drive gear 159 similar to the drive gears 111 and 112, and similarly secured to the motor driven rotating means, is adapted to coact with similar outstanding circumferentially spaced pins (not shown) on the outer annular rims 151 and 152, to rotate the compound bucket wheel 146, in the same manner that the single bucket wheel is rotated.

Figure 11:
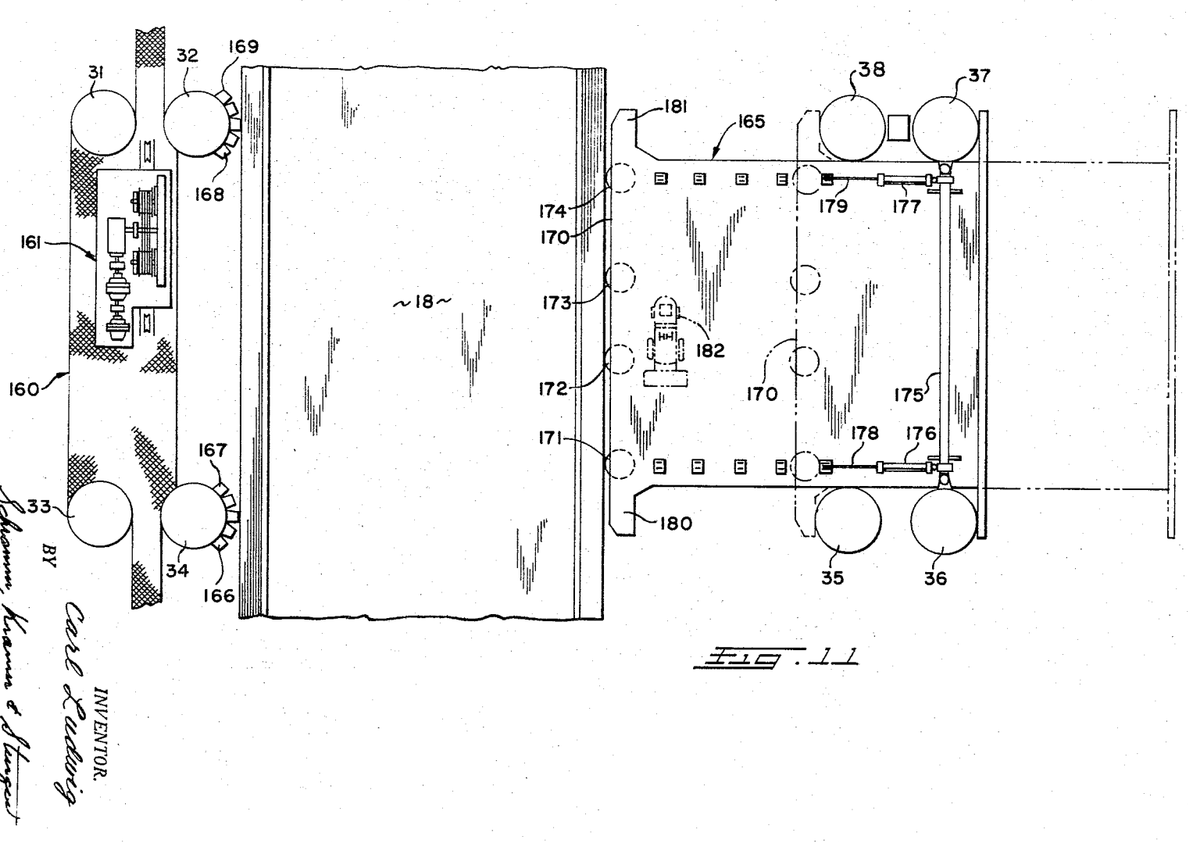
FIG. 11 is an enlarged top view of a floating barge clamp and pier.

A preferred embodiment of the pier is shown in FIG. 11. This embodiment of the pier is in the form of a floating pier 160 which is guided by and floats between offshore towers 31 and 32, and 33 and 34, respectively (FIGS. 2 and 11). As the tide rises and falls, the floating pier 160 correspondingly raises or lowers. The use of a floating pier facilitates securing the barges into the haulage system as a fixed positioning relationship between the pier and barge is maintained. A conventionally designed motor driven haulage unit indicated at 161 may be mounted on the floating pier 160.

Also shown in FIG. 11 is a floating barge clamp generally indicated at 165. The barge clamp 165 is guided and floats between the inshore towers (FIGS. 2 and 11) 37 and 38, and 35 and 36, respectively. As the barge 18 is raised or lowered by the changing tides, so too is the floating barge clamp 165 correspondingly raised or lowered. The barge 18 to be unloaded is secured into the haulage system and brought into unloading position adjacent the towers 32 and 34. A plurality of vertical bumper blocks, e.g. blocks 166, 167, 168, and 169 are secured to the towers 32 and 34 adjacent the barge 18. These bumper blocks, made of wood or hard rubber, protect the adjacent towers from being damaged by the barge 18. The barge clamp 165 is extended to the position shown in FIG. 11, clamping the barge 18 against the bumper block protected towers 32 and 34. A plurality of bumpers are also secured along the marginal edge 170 of the barge clamp 165 adjacent the barge 18. In this embodiment of the barge clamp 165, a plurality of rubber tires, e.g. tires 171, 172, 173 and 174, are secured along the marginal edge 170. The retracted or unclamped position of the barge clamp 165 is indicated in the broken line drawing of FIG. 11. Flange portions at each side of the barge clamp 165 along the front marginal edge 170 abut adjacent towers to keep the clamp 165 from being retracted beyond its retracted or unclamped position; for example, flange portions 180 and 181 of the clamp 165 abut towers 35 and 38, respectively.

A cylinder supporting rod 175 is secured between towers 36 and 37. Rotatably secured to rod 175 adjacent towers 36 and 37, respectively, are hydraulic cylinders 176 and 177, whose movable piston extensions 178 and 179, respectively, are secured to the barge clamp 165 adjacent its marginal edge 170. These hydraulically operated pistons are adapted to move the barge clamp 165 into and out of clamping position against the barge 18. The hydraulically operated pistons within the cylinders 176 and 177, when in an extended locked position are adapted to compensate for movement of the barge clamp 165 caused by changing tides. A conventionally designed tractor indicated at 182, is kept atop the barge clamp 165 to clear the surface of any bulk material or debris which might spill from the barge or the rotary bucket wheel assembly during operation.

Thus, an improved structure for unloading barges is provided by suspending the bucket wheel reclaiming unit below the bridge as shown and described. The weight of the various components has been drastically reduced, thus providing a highly improved and economical rotary bucket wheel barge unloader.

What is claimed is:
1. In a system for transferring bulk material from one predetermined location to another including:
   (a) tower means defining an unloading station;
   (b) bridge means spanning said unloading station and supported by said tower means;
   (c) a driven rotary bucket wheel unloader adapted to engage and transport bulk material;
   (d) means for receiving and conveying bulk material from the unloader to said other predetermined location; and
   (e) a carriage movably supported on said bridge means for transverse movement therealong and coacting therewith to support said rotary bucket wheel unloader on said carriage for rotation on an axis which lies in a plane passing through the bridge and having the same predetermined relationship to the longitudinal axis of the bridge in all positions of operation of said rotary bucket wheel, and in spaced independent relation from said bridge means, the longitudinal axis of said bridge lying wholly outside the path described by the buckets during rotation thereof, for operative intersection with and transport of the bulk material.

2. A system for transferring bulk material from one predetermined location to another in accordance with claim 1 wherein the axis of rotation of said rotary bucket wheel is parallel to the longitudinal axis of the bridge.

3. A system for transferring bulk material from one predetermined location to another in accordance with claim 1 additionally including:
   (f) means for raising and lowering said carriage relative to said tower means.

4. A system for transferring bulk material from one predetermined location to another in accordance with claim 1 wherein said tower means includes:
   (a) a first tower and a second tower in spaced relation to each other defining an unloading station therebetween.

5. A system for transferring bulk material from one predetermined location to another in accordance with claim 4 wherein said bridge is supported for vertical movement along said first and second towers, and wherein said system additionally includes:
   (f) means for raising and lowering said bridge.

6. A system for transferring bulk material from one predetermined location to another in accordance with claim 5 which additionally includes:
   (g) a container for said bulk material having side walls; and
   (h) clamping means coacting between at least one of said towers and said bulk material container to urge the container into abutting relation with the other of said towers to prevent lateral movement of said bulk material container.

7. A system in accordance with claim 6 wherein said clamping means are adjustable to varying bulk material container widths.

8. A system for transferring bulk material from one predetermined location to another in accordance with claim 4 additionally including:
   (f) means for raising and lowering said carriage relative to said towers.

9. A system for transferring bulk material from one predetermined location to another in accordance with claim 1 in which
   (d) the means for receiving and conveying bulk material, includes a conveyor mounted on the carriage and extending transversely to the axis of the bucket wheel.

10. A system for transferring bulk material from one predetermined location to another in accordance with claim 1 in which (d) the means for receiving and conveying bulk material includes a conveyor supported by the carriage and extending through the bucket wheel parallel to its axis of rotation.

11. A system for transferring bulk material from one predetermined location to another in accordance with claim 1 wherein said bucket wheel unloader has an inner periphery defining a central opening and wherein said carriage includes a depending frame having a plurality of rollers spaced circumferentially about the inner periphery of said bucket wheel unloader within said central opening, and driven means carried by the frame for drivingly engaging said bucket wheel unloader.

12. A system for transferring bulk material from one predetermined location to another in accordance with claim 10 which includes a mold board stationarily supported on said frame and including means coacting with the bucket wheel unloader to maintain the mold board in predetermined relation between the respective sides of the bucket wheel to prevent damage thereto when the bucket wheel tends to shift laterally in response to disorienting influences in the material being unloaded.

References Cited by the Examiner
UNITED STATES PATENTS

| | | | |
|---|---|---|---|
| 3,062,392 | 11/1962 | Eppard | 214—4 |
| 3,104,766 | 9/1963 | Sasadi | 214—4 |
| 3,225,943 | 12/1965 | Sasadi | 214—10 |

References Cited by the Applicant
UNITED STATES PATENTS

| | | |
|---|---|---|
| 3,069,027 | 12/1962 | Dischinger. |
| 3,224,604 | 12/1965 | Adler et al. |

GERALD M. FORLENZA, *Primary Examiner.*

R. G. SHERIDAN, *Assistant Examiner.*

Disclaimer 3,307,717.—*Carl Ludwig*, Cleveland, Ohio BUCKET WHEEL BULK MATERIAL HANDLING APPARATUS. Patent dated Mar. 7, 1969. Disclaimer filed Mar. 19, 1969, by the assignee, *McDowell-Wellman Engineering Company*.

Hereby enters this disclaimer to claims 1, 2, 3, 4, 5, 8 and 9 of said patent.
[*Official Gazette July 8, 1969.*]